United States Patent

Parish et al.

[19]

[11] Patent Number: 6,037,898
[45] Date of Patent: Mar. 14, 2000

[54] METHOD AND APPARATUS FOR CALIBRATING RADIO FREQUENCY BASE STATIONS USING ANTENNA ARRAYS

[75] Inventors: David M. Parish, Los Altos; Farhad Farzaneh, San Francisco; Craig H. Barratt, Redwood City, all of Calif.

[73] Assignee: ArrayComm, Inc., San Jose, Calif.

[21] Appl. No.: 08/948,772

[22] Filed: Oct. 10, 1997

[51] Int. Cl.$^7$ ..................................................... G01S 13/00
[52] U.S. Cl. ........................................... 342/174; 342/378
[58] Field of Search ..................................... 342/378, 174

[56] References Cited

U.S. PATENT DOCUMENTS

| | | | |
|---|---|---|---|
| 5,274,844 | 12/1993 | Harrison et al. | |
| 5,530,449 | 6/1996 | Wachs et al. | 342/174 |
| 5,543,801 | 8/1996 | Shawyer | 342/354 |
| 5,546,090 | 8/1996 | Roy, III et al. | 342/174 |

FOREIGN PATENT DOCUMENTS

WO 95/34103  12/1995  WIPO ............................ H01Q 3/26

OTHER PUBLICATIONS

PCT Search Report on PCT application PCT/US98/25364 mailed on May 11, 1999.

*Primary Examiner*—Theodore M. Blum
*Attorney, Agent, or Firm*—Townsend and Townsend and Crew LLP; Henry K. Woodward; Dov Rosenfeld

[57] ABSTRACT

A method operating in a communications station for calibrating the communications station, the communications station including an antenna array of antenna elements, each having associated with it and included in a transmit apparatus chain and a receiver apparatus chain. The method comprises transmitting a prescribed signal from each antenna element using the transmit apparatus chain associated with the antenna element while receiving the transmitted signal in receiver apparatus chains not associated with the antenna. Calibration factors for each antenna element are determined as dependent on the associated transmit apparatus chain and receiver apparatus chain transfer functions using the prescribed signal and each of the signals received during transmissions. A communications station also is described which includes: an antenna array of a plurality of elements, each antenna element having associated with it and included in a transmit apparatus chain and a receiver apparatus chain; transmitting means configured to transmit a prescribed signal from each antenna element while receiving the transmitted signal in at least one receiver apparatus chain not associated with the transmitting antenna element; a memory coupled to the receiver apparatus chains for storing the signals received during the transmissions of the prescribed signals; and a signal processor coupled to the memory and configured to determine calibration factors for each antenna element, the calibration factors for a particular antenna element based on the transmit apparatus chain and receiver apparatus chain transfer functions of the transmit and receiver apparatus chains, respectively, that are associated with the particular antenna element.

33 Claims, 4 Drawing Sheets

METHOD AND APPARATUS FOR CALIBRATING RADIO FREQUENCY BASE STATIONS USING ANTENNA ARRAYS

BACKGROUND OF THE INVENTION

1. Field of the Invention

This invention relates to radio frequency systems using antenna arrays, and more specifically to the calibration of such systems.

2. Background

Antenna arrays may be used in any type of system that transmits or receives radio frequency signals using an antenna or antennas. Examples of such systems are radio communication systems, radars, and certain medical systems that employ radio frequency signals. The use of antenna arrays in such systems provides for antenna performance improvements over the use of a single element antenna. These antenna performance improvements include improved directionality, signal to noise ratio, and interference rejection for received signals, and improved directionality, security, and reduced transmit power requirements for transmitted signals. Antenna arrays may be used for signal reception only, for signal transmission only, or for both signal reception and transmission.

Typical antenna array systems consist of an array of antennas and a signal processor that combines the signals going to and coming from the individual array elements. This processing sometimes is called beamforming.

A typical application of antenna array systems is in a wireless communication system. Examples include a cellular communication system and a wireless local loop system. Such wireless communication systems consist of one or more communications stations, generally called base stations, each communicating with its subscriber units, also called remote terminals and handsets. In cellular systems, the remote terminal typically is mobile, while in a wireless local loop system the remote unit typically is in a fixed location. The antenna array typically is at the base station. Terminology for the direction of communication comes from conventional satellite communications, with the satellite replaced by the base station. Thus, communication from the remote terminal to the base station is called the uplink, and communications from the base station to the remote terminal is called the downlink. Thus, the antenna array transmits in the downlink direction and receives in the uplink direction. Antenna arrays also may be used in wireless communication systems to add spatial division multiple access (SDMA) capability, which is the ability to communicate with several users at the time over the same "conventional" (FDMA, TDMA or CDMA) channel. We have previously disclosed spatial processing with antenna arrays to increase the spectrum efficiency of SDMA and non-SDMA systems. See U.S. Pat. No. 5,515,378 issued 7 May 1996 entitled Spatial Division Multiple Access Wireless Communications System, incorporated herein by reference, U.S. Pat. No. 5,592,490 issued 7 Jan. 1997 entitled Spectrally Efficient High Capacity Wireless Communications Systems, also incorporated herein by reference, U.S. patent application Ser. No. 08/735,520 filed Oct. 23, 1996, entitled Spectrally Efficient High Capacity Wireless Communications Systems with Spatio-Temporal Processing, also incorporated herein by reference, and U.S. patent application Ser. No. 08/729,390 filed Oct. 11, 1996, entitled Method and Apparatus for Decision Directed Demodulation Using Antenna Arrays and Spatial Processing, also incorporated herein by reference. Systems that use antenna arrays to improve the efficiency of communications and/or to provide SDMA sometimes are called smart antenna systems. The above patents and patent applications are collectively referred to herein as "Our Smart Antenna Invention Documents."

With smart antenna communication systems, during uplink communications, one applies amplitude and phase adjustments to each of the signals received at the antenna array elements to select (i.e., preferentially receive) the signals of interest while minimizing any signals or noise not of interest—that is, the interference. Such amplitude and phase adjustment can be described by a complex valued weight, the receive weight, and the receive weights for all elements of the array can be described by a complex valued vector, the receive weight vector. Similarly, the downlink signal is processed by adjusting the amplitude and phase of the signals that are going to each of the antennas of the antenna array for transmission. Such amplitude and phase control can be described by a complex valued weight, the transmit weight, and the weights for all elements of the array by a complex valued vector, the transmit weight vector. In some systems, the receive (and/or transmit) weights include temporal processing, and in such cases, the receive (and/or transmit) weights may be functions of frequency and applied in the frequency domain or, equivalently, functions of time applied as convolution kernels.

Typically, the receive weight vector is determined from the spatial signature of a particular remote user, which in turn is determined by different techniques, for example from the uplink signals received at the antennas of the array from that remote user. The spatial signature (also called the receive manifold vector) characterizes how the base station array receives signals from a particular subscriber unit in the absence of any interference or other subscriber units. In normal operation, the receive weight vector may be determined by the spatial signature and any interference. The transmit weight vector used to communicate in the downlink with a particular user is also determined from the spatial signature of the particular user. It is thus desirable to determine the transmit weight vector from the receive weight vector for a particular user.

Time division duplex (TDD) systems are those in which uplink and downlink communications with a particular remote user occur at the same frequency but different time slots. Frequency division duplex (FDD) systems are those in which uplink and downlink communications with a particular remote user occur at the different frequencies.

Practical problems may make determining the transmit weight vector from the receive weight vector for a particular user difficult to do. Time division duplex (TDD) systems are those in which uplink and downlink communications with a particular remote user occur at the same frequency but different time slots. Frequency division duplex (FDD) systems are those in which uplink and downlink communications with a particular remote user occur at the different frequencies. Because of the well known principle of reciprocity, it might be expected that determining the transmit weight vector from the receive weight vector might be straightforward. However, in the uplink, the received signals that are being processed may be somewhat distorted by the receive apparatus chains associated with each of the antenna elements of the antenna array. The receive apparatus chain includes the antenna element, cables, filters, RF electronics, physical connections, and analog-to-digital converter ("ADC") if processing is digital. In the case of a multi-element antenna array, there typically is a separate receive apparatus chain for each antenna array element, and thus the amplitude and the phase each of the received signals at each element may be distorted differently by each of the receive apparatus chains. A receive weight vector that does not take this into account will be in error, causing less than optimal reception at the base station. However, in practice, communications will still be possible. When one transmits downlink signals through the antenna array, each of the signals radiated by an antenna element goes through a different transmit apparatus chain, thus possibly causing different amplitude and phase shifts in the transmitted signals. If the transmit weight vector was derived from a receive weight vector that did not take the differences in the receive apparatus chains into account, transmission from the base station may be hard to achieve. Further difficulty may result if the transmit weight vector does not take differences in the transmit apparatus chains into account, possibly making communication using such a transmit weight vector not optimal. The purpose of calibration is to determine calibration factors for compensating for the different amplitude and phase errors that occur in the signals in the receive chain and the different amplitude and phase errors that occur in the transmit chain. It should be added that the phase and amplitude shifts that occur in the receive and transmit apparatus chains are, in general, frequency dependent.

Determining the transmit weight vectors from the receive weight vectors for a particular user is more difficult in the case of an FDD system because reciprocity may no longer be assumed. One needs to additionally take into account the differences in propagation in the uplink and downlink. Once one does take such differences into account, there still is a need to determine calibration factors for compensating for the different amplitude and phase errors that occur in the signals in the receive chain and the different amplitude and phase errors that occur in the transmit chain.

Originally, manufacturers of antenna array systems used signal processors that assumed ideal antenna arrays in which all transmit and receive electronics were assumed to be perfect, or in which the transmit and receive apparatus chains were assumed to be identical for each of the antennas. As a result, these antenna array systems were not only difficult to design and manufacture, they were prohibitively expensive and subject to errors, interference, and drifts over time. Using receive weights for determining transmit weights may not lead to effective communications with such a system.

It is known that compensation can be achieved by convolving each of the m signals received or transmitted by the antenna elements by a complex calibration function (i.e., by a complex valued time sequence), where each calibration function describes the transfer function correction required to compensate for the gain and phase errors a signal undergoes when passing through the transmit (or receive) apparatus chains. In some systems, this can be simplified to multiplicative correction, where each calibration function is a calibration factor—a complex valued number that describes the required amplitude and phase correction required for compensation. In general, the set of calibration functions are the elements of a calibration vector function, one complex valued calibration vector function for the transmit path, and one for the receive path, where each function is a time sequence. In the case of multiplicative correction, the set of calibration factors are the elements of a calibration vector, one complex valued calibration vector for the transmit path, and one for the receive path. Prior-art methods for determining array calibration vector functions involve measurements that have several associated drawbacks. Firstly, the methods require external measuring equipment which may be expensive, unwieldy and cumbersome to use repeatedly. Secondly, conventional calibration methods are sensitive to drifts in system parameters, such as frequency references, over the extended period of time during which measurements are being taken, and these drifts result in inaccuracies in the measured array calibration vector. In addition, some prior art techniques only determine multiplicative rather than convolution kernel calibration factors, and there are frequency dependent components in the antenna array. In order to eliminate this frequency dependence and still use multiplicative calibration vectors, it is necessary to calibrate the antenna array for each frequency channel of communication. Thirdly, the transfer characteristics of the RF electronics depend on changing ambient conditions such as temperature, humidity, etc., which makes it essential that antenna arrays be repeatedly calibrated in their ambient environment.

Harrison et al. disclose in U.S. Pat. No. 5,274,844 (Dec. 28, 1993) a method for calibrating transmit and receive calibration vectors (as complex valued vector transfer functions) in two experiments which involve a data bus connecting a resource controller to a remote terminal. In the first experiment, the data bus indicates to the remote terminal to send a known signal to the base station. This determines the receive apparatus chain calibration. In a second experiment, the signals received at the remote terminal are sent back to the resource controller via the data bus to enable determining the transmit apparatus chain calibration.

Co-owned U.S. Pat. No. 5,546,090, issued 13 Aug. 1996, and assigned to the assignee of the present invention, discloses a calibration method which can determine both transmit and receive calibration vectors using a simple transponder co-located with the remote terminal that re-transmits to the base station the signals received at the remote terminal from the base station. Such a method does not require the wired data-bus of the Harrison et al. invention. Still, additional transponder equipment is required.

While these prior art calibration methods provide separate calibrations for the receive and transmit paths, and also calibrate for the different air paths between the base station antenna elements and the subscriber unit, the methods require special calibration apparatus.

PCT Patent application publication WO 95/34103 (published Dec. 14, 1995) entitled Antenna array calibration, Johannisson, et al., inventors, discloses a method and apparatus for calibrating the transmission (and reception) of an antenna array. For transmit calibration, an input transmit signal is inputted into each antenna element one antenna at a time. After the input transmit signal has passed through a respective power amplifier, the signal transmitted by each antenna element is sampled by a calibration network. The resulting signal is fed into a receiver, and a computation means relates the received signal with the original transmit signal for each antenna element. Correction factors can then be formed for each antenna element. The antenna elements may then be adjusted (in amplitude and phase, or in-phase I and quadrature Q components) using the correction factors so as to ensure that each element is properly calibrated during transmission. For receive calibration, an known input signal is generated and injected using a calibration network (a passive distribution network) into each antenna element of the antenna array. The signals pass from the antenna elements trough respective low noise amplifiers, and the signals thus received by each antenna element are measured by a beam forming apparatus. The beam forming apparatus can then generate correction factors by comparing the injected signal with the measured signals so as to individually calibrate each antenna element. The correction can be described as amplitude and phase corrections, or as corrections in in-phase I and quadrature Q components.

While the Johannisson et al. method provides separate calibrations for the receive and transmit paths, the method requires special calibration apparatus.

Thus there is a need in the art for a calibration method and apparatus which is simple, both in terms of the equipment necessary and the time required, so that calibration can be performed repeatedly and rapidly wherever and whenever desired. There also is a need in the art for a simple calibration technique that only uses existing base station electronics and does not require special calibration hardware. There also is a need in the art for a method that enables one to determine transmit weight vectors from receive weight vectors, including calibrating for the receive apparatus and transmit apparatus chains, the calibration obtained using simple techniques that use existing base station electronics and do not require special calibration hardware.

SUMMARY OF THE INVENTION

Objects of the Invention

An object of the present invention is an improved method and apparatus for calibrating a base station using an antenna array without the need for any additional, expensive and unwieldy calibration instruments.

Another object of the invention is a calibration method and apparatus that reduces the amount of time required to calibrate a base station and enables using a calibrated transmit weight vector, the transmit weight vector essentially determined from a receive weight vector.

Still another object of the invention is a method and apparatus for calibrating an antenna array system that can be easily used at an installation site, the calibration enabling the use of a calibrated transmit weight vector, the transmit weight vector essentially determined from a receive weight vector.

Another object of the invention is a calibration method and apparatus that can be readily implemented in a radio frequency system and that makes it practical to perform frequent and routine system calibration, the calibration enabling the use of a calibrated transmit weight vector, the transmit weight vector essentially determined from a receive weight vector.

Another object of the invention is a method for determining calibrated transmit weight vectors from receive weight vectors, the calibration of the transmit weight vectors accounting for phase errors introduced by the receive apparatus and transmit apparatus chains, the calibration using existing base station electronics.

Overview of the Invention

The above and other objects of the invention are provided for in a method which operates in a communications system comprising at least one subscriber unit and at least one communications station (base station), the communications station including an antenna array of a plurality of elements. Each antenna element has associated with it and is included in a transmit apparatus chain and a receiver apparatus chain. The phase and amplitude behavior of each chain is essentially described by a receiver apparatus chain transfer function (if a receiver apparatus chain) or a transmit apparatus chain transfer function (if a transmit apparatus chain).

In one aspect of the invention, a method for calibratiing the communications station is described comprising transmitting a prescribed signal from an antenna element using the transmit apparatus chain associated with the antenna element while receiving the transmitted signal in at least one receiver apparatus chain not associated with the antenna. This is repeated, transmitting prescribed signals (which in general need not be the same) from other antenna elements using other transmit apparatus chains until prescribed signals have been transmitted from all antenna elements for which calibration factors are required. Calibration factors for each antenna element are determined, the calibration factor of an antenna element dependent on the associated transmit apparatus chain and receiver apparatus chain transfer functions, the determining using the prescribed signal(s) and each of the signals received during transmissions. In one particular embodiment, the prescribed signals are the same for each transmission, and the received signals are stored during reception for further processing.

The calibration factors in general are dependent on frequency. One particular embodiment describes determining calibration factors that are essentially independent of frequency in the frequency range of interest.

Again, one embodiment described determines the transmit apparatus chain transfer functions and the receiver apparatus chain transfer functions. One embodiment of this case includes designating one receiver apparatus chain and one transmit apparatus chain sharing a common antenna element as a reference, such that all receiver and transmit apparatus chain transfer functions are respectively determined relative to the reference receive apparatus and reference transmit apparatus transfer functions.

Another particular embodiment applies for when downlink and uplink communication between the communications station and the subscriber unit occurs in the same frequency channel. In that case, a single calibration factor is determined for any antenna element. In one version, the single calibration factor is in phase a function of the difference between the transmit apparatus chain transfer function phase and the receiver apparatus chain transfer function phase associated with a particular antenna element. In this case, one may designate one antenna element as a reference antenna element, such that all calibration factors not associated with the reference antenna element are respectively determined relative to the calibration factor associated with the reference antenna element. For example, the calibration factor for a particular antenna element that is not the reference antenna element can be determined in phase as a function of phase difference between the signal received at the receiver apparatus chain associated with the particular antenna element when the prescribed signal is transmitted from the transmit apparatus chain associated with the reference antenna, and the signal received at the receiver apparatus chain associated with the reference antenna element when the prescribed signal is transmitted from the transmit apparatus chain associated with the particular antenna element.

In another version, the single calibration factor is in phase a function of the ratio of the transmit apparatus chain transfer function to the receiver apparatus chain transfer function associated with a particular antenna element. In this case too, one may designate one antenna element as a reference antenna element, such that all calibration factors not associated with the reference antenna element are respectively determined relative to the calibration factor associated with the reference antenna element. For example, the calibration factor for a particular antenna element that is not the reference antenna element can be determined as a function of the ratio of the signal received at the receiver apparatus chain associated with the particular antenna element when the prescribed signal is transmitted from the transmit apparatus chain associated with the reference antenna, to the signal received at the receiver apparatus chain associated with the reference antenna element when the prescribed signal is transmitted from the transmit apparatus chain associated with the particular antenna element.

In another aspect of the invention, a method for sending a downlink signal from a communications station to a subscriber unit is described. The method comprises performing an experiment at the communications station to determine a set of calibration factors, each calibration factor associated with a particular antenna element, weighting the downlink signal according to a set of transmit weights to form a set of weighted transmit signals for each antenna element, where the transmit weight for the particular antenna element determined from signals received at the antenna array during uplink communications with the subscriber unit and from the calibration factor associated with the particular antenna element, and transmitting the weighted transmit signals through the transmit apparatus chains. In one embodiment, where the communications station is able to communicate in the uplink with the subscriber unit by processing received baseband signals, and each received baseband signal is determined from a corresponding signal at one of the antenna elements, the processing includes weighting the received baseband signals according to a set of receive weights determined from the received baseband signals, each receive weight corresponding to one of the antenna elements. In this embodiment, the transmit weight for the particular antenna element is determined from the receive weight corresponding to the particular antenna element and from the calibration factor associated with the particular antenna element. In the case that downlink communication and uplink communication between the communications station and the subscriber unit occur in the same frequency channel, the calibration factor used is in phase a function of the difference between the transmit apparatus chain transfer function phase and the receiver apparatus chain transfer function phase for the corresponding antenna element, and each transmit weight is proportional to the corresponding receive weight and to the corresponding calibration factor. In another case where downlink communication and uplink communication between the communications station and the subscriber unit occur in the same frequency channel, the calibration factor used is a function of the ratio of the transmit apparatus chain transfer function to the receiver apparatus chain transfer function for the corresponding antenna element, and each transmit weight is proportional to the corresponding receive weight and to the corresponding calibration factor.

The experiment to determine the calibration factors to use for determining the transmit weights from the receive weights may follow any of the methods described above to determine calibration factors.

In another aspect of the invention, an apparatus for calibrating a communications station is described, the apparatus part of the communications station.

DESCRIPTION OF THE PREFERRED EMBODIMENT

Figure 1:
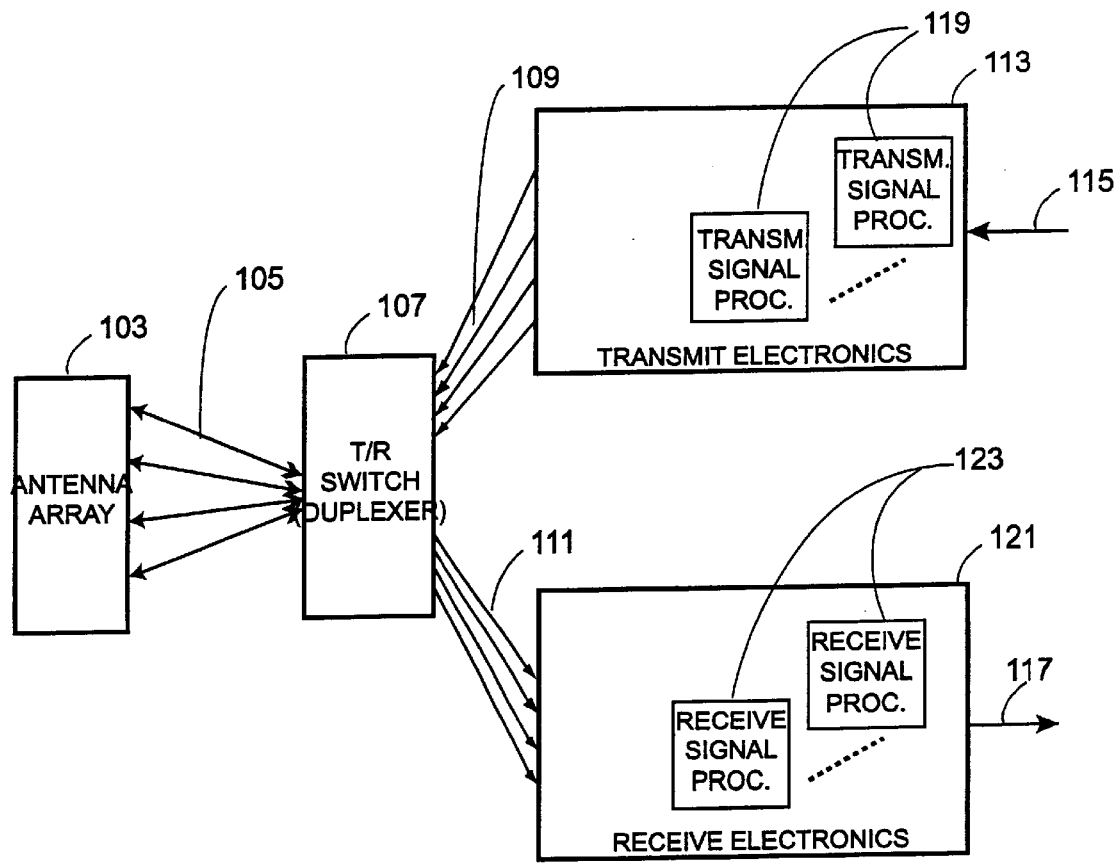
FIG. 1 shows an antenna array system using a single antenna array for both transmitting and receiving, on which and for which embodiments of the invention may be implemented.

FIG. 1 shows an antenna array base station system using a single antenna array 103, which is used for both transmitting and receiving. The preferred embodiment of the method and apparatus of the present invention is implemented for operating with a system having this general configuration. While systems similar to that shown in FIG. 1 may be prior art, a system such a that of FIG. 1 with elements programmed or hard wired to carry aspects of the present invention is not prior art. In FIG. 1, a transmit/receive ("TR") switch 107 is connected between antenna array 103 and both transmit electronics 113 (including one or more transmit signal processors 119), and receive electronics 121 (including one or more receive signal processors 123), for selectively connecting one or more elements of antenna array 103 to the transmit electronics 113 when in the transmit mode and to receive electronics 121 when in the receive mode. Two possible implementations of switch 107 are as a frequency duplexer in a frequency division duplex (FDD) system, and as a time switch in a time division duplex (TDD) system. The preferred embodiment of this invention uses TDD.

The transmit and receive electronics, (elements 113 and 121, respectively) may be implemented using analog electronics, digital electronics, or a combination of the two. Signal processors 119 and 123 may be static (always the same), dynamic (changing depending on desired directivity), or smart (changing depending on received signals), and in the preferred embodiments are adaptive. Signal processors 119 and 123 may be the same one or more DSP devices with different programming for the reception and transmission, or different DSP devices, or different devices for some functions, the same for others.

Unfortunately, due to normal manufacturing variance in the construction of antenna array 103, cables 105, 109 and 111, respectively, and transmit and receive electronics chains 113 and 121, respectively, there will be differing errors and non-linearities introduced by these components, and identical signals passing through the different elements of antenna array 103 will emerge with different amplitudes and phases. Similarly, identical signals passing through different channels in cables 109 and 111, respectively, and electronics 113 and 121, respectively, will be altered in amplitude and phase. These composite amplitude and phase errors can be captured by a set of receive and transmit array calibration transfer functions, the elements of which can be lumped together to form a receive and a transmit calibration transfer function vector. Each element of antenna array 103, the corresponding channel of cables 105 and 109, the corresponding channel of switch 107, and the corresponding channel of transmit electronics 113 shall be referred to as the transmit apparatus chain of the transmit antenna element, and each element of antenna array 103, the corresponding channel of cables 105 and 109, the corresponding channel of switch 107, and the corresponding channel of receive electronics 123 shall be referred to as the receiver apparatus chain of the antenna element. Such an array calibration transfer vector transmutes the actual signals that are seen at the end of each chain from an antenna array element into corresponding signals that are expected at the end of each chain if all components were identical and behaved perfectly. Because the transmit signals and the receive signals follow somewhat different hardware paths, the system will have both a transmit and a receive array calibration vector transfer function. The input to the transmit apparatus chain is transmit signal input 115, and the output of the receiver apparatus chain is receive signal output 117.

The various preferred embodiments of the present invention are for incorporation in a cellular system using the "Personal Handyphone System" (PHS), ARIB Standard, Version 2 (RCR STD-28). The base station of a PHS system used in these embodiments generally conforms to FIG. 1. The PHS system is an 8 slot time division multiple access (TDMA) system with true time division duplex (TDD). Thus, the 8 timeslots are divided into 4 transmit (TX) timeslots and 4 receive (RX) timeslots. This implies that for any particular channel, the receive frequency is the same as the transmit frequency. It also implies reciprocity, i.e., the propagation path for both the downlink (from base station to users' remote terminals) and the uplink (from users' remote terminals to base station) is identical, assuming minimum motion of the subscriber unit between receive timeslots and transmit timeslots. The frequency band of the PHS system used in the preferred embodiment is 1895–1918.1 MHz. Each of the 8 timeslots is 625 microseconds long. The PHS system has a dedicated frequency and timeslot for a control channel on which call initialization takes place. Once a link is established, the call is handed to a service channel for regular communications. Communication occurs in any channel at the rate of 32 kbits per second (kbps), called full rate. Less than full rate communication is also possible, and the details of how to modify the embodiments described herein to incorporate less than full rate communication would be clear to those of ordinary skill in the art.

In the PHS used in the preferred embodiment, a burst is defined as the finite duration RF signal that is transmitted or received over the air during a single timeslot. A group is defined as one set of 4 TX and 4 HANDYPHONE timeslots. A group always begins with the first TX timeslot, and its time duration is 8×0.625=5 msec.

The PHS system uses $\pi/4$ differential quaternary (or quadrature) phase shift keying ($\pi/4$ DQPSK) modulation for the baseband signal. The baud rate is 192 kbaud. That is, there are 192,000 symbols per second.

Figure 2:
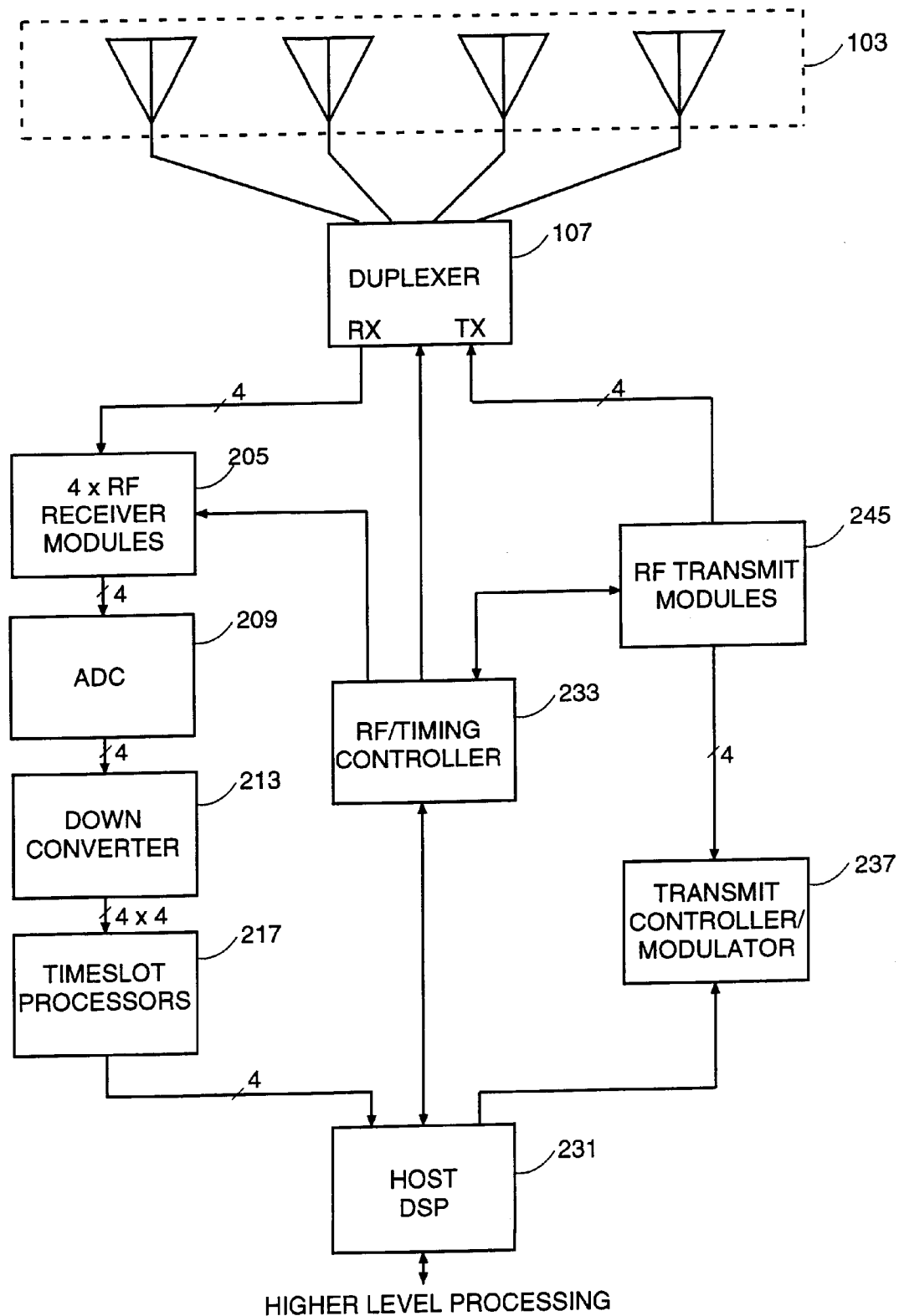
FIG. 2 shows a simplified block diagram of a PHS base station on which an embodiment of the invention is implemented.

FIG. 2 shows a simplified block diagram of a PHS base station on which an embodiment of the invention is implemented. Again, while systems with architectures similar to that shown in FIG. 2 may be prior art, a system such a that of FIG. 2 with elements programmed or hard wired to carry aspects of the present invention is not prior art. In FIG. 2, a plurality of m antennas 201 is used, where m=4. The outputs of the antennas are connected to a duplexer switch 107, which in this TDD system is a time switch. When receiving, the antenna outputs are connected via switch 107 to a receiver 205, and are mixed down in analog by RF receiver ("RX") modules 205 from the carrier frequency (around 1.9 GHz) to a fmal intermediate frequency ("IF") of 384 kHz. This signal then is digitized (sampled) by analog to digital converters ("ADCs") 209 at 1.536 MHz. Only the real part of the signal is sampled. Thus, in complex phasor notation, the digital signal can be visualized as containing the complex valued IF signal at 384 kHz together with an image at −384 kHz. Final down-converting to baseband is carried out digitally by multiplying the 1.536 megasamples per second real-only signal by a 384 kHz complex phasor. The result is a complex valued signal that contains the complex valued baseband signal plus an image at −2×384=−768 kHz. This unwanted negative frequency image is filtered digitally to produce the complex valued baseband signal sampled at 1.536 MHz. In the preferred embodiment, GrayChip Inc. GC2011 digital filters are used to implement the downconverting and the digital filtering, the latter using finite impulse response (FIR) filtering techniques. This is shown as block 213.

There are four downconverted outputs from each antenna's GC2011 digital filter device 213, one per receive timeslot. For each of the four receive timeslots, the four downconverted outputs from the four antennas are fed to a digital signal processor (DSP) device 217 (hereinafter "timeslot processor") for further processing, including calibration, according to one aspect of this invention. In the preferred embodiment, four Motorola DSP56303 DSPs are used as timeslot processors, one per receive timeslot.

The timeslot processors 217 perform several functions including the following: received signal power monitoring, frequency offset estimation and time alignment, smart antenna processing including determining weights for each antenna element to determine a signal from a particular remote user, and demodulation of the determined signal.

The output of the timeslot processor 217 is demodulated burst data for each of the four receive timeslots. This data is sent to host DSP processor 231 whose main function is to control all elements of the system and interface with the higher level processing, which is the processing which deals with what signals are required for communications in all the different control and service communication channels defined in the PHS communication protocol. In the preferred embodiment, host DSP 231 is a Motorola DSP56303. In addition, timeslot processors send the determined receive weights to host DSP 231. The main functions of host DSP 231 specifically include:

maintaining state and timing information;

receiving uplink burst data from timeslot processors 217;

programming timeslot processors 217, including, in one embodiment, instructing timeslot processors 217 to enter calibration mode. Calibration mode occurs after the base station has assigned a traffic channel to the remote user. In calibration mode, in the preferred embodiment, the base station takes one RX timeslot in four consecutive frames in the newly assigned traffic channel, and performs the calibration method of the preferred embodiment described herein. The calibration experiment preferably is performed only during RX timeslots because during TX timeslots, the master base station could be transmitting and could saturate the low noise amplifiers in the system. In alternative embodiments, the calibration experiment is performed during TX timeslots. In calibration mode, at the conclusion of each frame, partial results are uploaded from timeslot processors 217 to host DSP 231 for further processing to determine calibration factors. Host DSP 231 then scales the calibration factors with values read from the automatic gain compensation ("AGC") circuitry and then saves the data;

in normal mode, processing the uplink signals, including de-encrypting, de-scrambling, error correcting (CRC) code checking, and burst deconstruction of the uplink;

in normal mode, formatting the uplink signal to be sent for higher level processing in other parts of the base station;

in normal mode, formatting adaptive differential pulse code modulated ("ADPCM") voice data and formatting service data for further higher processing in the base station;

in normal mode, receiving downlink messages and ADPCM voice data (and bearer service data) from the other parts of the base station;

in normal mode, processing of downlink bursts (burst construction, CRC, scrambling and encryption);

formatting and sending downlink bursts to a transmit controller/modulator, shown as 237, including, when in calibration mode, formatting and sending calibration bursts to transmit controller/modulator 237.

programming transmit controller/modulator 237, including determining and sending transmit weight vectors to the transmit controller/modulator 237. In one embodiment, in normal mode, the transmit weight vectors are the receive weight vectors, corrected in host DSP 231 using the calibration factors determined during calibration mode according to the preferred embodiment of the method of the invention. The transmit weight vector is then scaled as a whole to comply with the desired transmit power limitations and then sent to transmit controller/modulator 237;

controlling the RF controller shown as 233; and in normal mode, maintaining and reporting modem status information, and controlling synchronization.

RF controller 233 interfaces with the RF system, shown as block 245 and also produces a number of timing signals that are used by both the RF system and the modem. The specific tasks performed by RF controller 233 include:

producing timing signals for the RF system (RX and TX) and other parts of the modem;

reading transmit power monitoring values;

writing transmit power control values;

producing the duplexer 107 switch box control signal; and reading automatic gain control (AGC) values.

RF controller 233 receives timing parameters and other settings for each burst from the host DSP 231.

Transmit controller/modulator 237, receives transmit data from host DSP 231, four symbols at a time. The transmit controller uses this data to produce analog IF outputs which are send to the RF transmitter (TX) modules 245. The specific operations transmit controller/modulator 237 performs are:

converting data bits into a complex modulated signal using ($\pi/4$ DQPSK modulation;

up-converting to a IF frequency of 1.536 MHz (still digital). This is carried out using a GrayChip 2011;

4-times over-sampling the 1.536 MHz IF signal to yield a 6.144 megasample/sec signal. Note that four-times oversampling the IF signal results in a 32-times sampled signal overall;

multiplying this 4-times over-sampled (compared to IF) complex signal by transmit weights obtained from host DSP 231. The real part of the resulting complex valued waveforms is taken to yield four real only IF signals; and converting these signals via digital to analog converters ("DACs") which are part of transmit controller/modulator 237 to analog transmit waveforms which are sent to transmit modules 245;

Transmit modules 245 upconvert the signals to the transmission frequency and amplify the signals. The amplified transmission signal outputs are sent to antennas 201 via duplexer/time switch 107.

The following notation is used. Let there be m antenna elements (m=4 in the preferred embodiment) and let $z_1(t)$, $z_2(t), \ldots, z_m(t)$ be the complex valued responses (that is, with in-phase I and quadrature Q components) of the first, second, ..., m'th antenna elements, respectively, after down-conversion, that is, in baseband, and after sampling. In the above notation, t is discrete. These m time-sampled quantities can be represented by a single m-vector z(t) with the i'th row of z(t) being $z_i(t)$. A finite number of samples is collected, so that $z_1(t)$, $z_2(t), \ldots, z_m(t)$ can each be represented as a row vector and z(t) can be represented by a matrix. Such details of incorporating a finite number of samples are however left out of this discussion, and how to include these details would be clear to those of ordinary skill in the art. Suppose several signals are sent to the base station from several remote users. In particular, suppose that a subscriber unit of interest transmits signal s(t). Spatial processing includes taking a particular combination of the I values and of the Q values of the received signals $z_1(t)$, $z_2(t)$, $\ldots, z_m(t)$ in order to extract an estimate of the transmitted signal s(t). Such weights may be represented by the receive weight vector for the this particular subscriber unit, denoted by a complex valued weight vector $w_r$, with $i^{th}$ element $w_{ri}$. The estimate of the signal sent is then $$\hat{s}(t) = \sum_{i=1}^{m} w'_{ri} z_i(t) = w_r^H z(t)$$

where $w'_{ri}$ is the complex conjugate of $w_{ri}$ and $w_r^H$ is the Hermitian transpose (that is, the transpose and complex conjugate) of receive weight vector $w_r$. In embodiments which include spatio-temporal processing, each element in the receive weight vector is a function of time, so that the weight vector may be denoted as $w_r(t)$, with $i^{th}$ element $w_{ri}(t)$. The estimate of the signal may then be expressed as $$\hat{s}(t) = \sum_{i=1}^{m} w'_{ri}(t) * z_i(t)$$

where the operator "*" is the convolution operation. Forming the estimate of the signal using spatio-temporal processing may equivalently be carried out in the frequency (Fourier transform) domain. Denoting the Frequency domain representations of s(t), $z_i(t)$, $w_{ri}(t)$, z(t), and $w_r(t)$ by S(k), $Z_i(k)$, $W_i(k)$, Z(k), and $W_r(k)$, respectively, where k is the discrete frequency value, $$\hat{S}(k) = \sum_{i=1}^{m} W'_{ri}(k) Z_i(k) = W_r^H Z(k).$$

In the remainder of the description, whenever complex valued receive weight vector $w_r$ or its elements are mentioned, it will be understood that this may be generalized to incorporate spatio-temporal processing as described above.

Several ways of determining complex valued weight vector $w_r$ for a particular signal of interest are possible within the scope of the present invention. In the preferred embodiment, the knowledge that the received signals have a particular modulation format is used to determine $w_r$ from the received signals themselves. A description how such an estimate of complex valued weight vector $w_r$ for a particular signal of interest is obtained, and how one demodulates the signal sent from such one particular remote terminal in the presence of the other signals from remote terminals, that is, in the presence of co-channel interferers is described in aforementioned U.S. patent application Ser. No. 08/729,390 filed Oct. 11, 1996, entitled Method and Apparatus for Decision Directed Demodulation Using Antenna Arrays and Spatial Processing (hereinafter "Our Demodulation Invention Document").

To transmit a modulated signal $s_t(t)$ to some remote user, one applies signals $z_{t1}(t), z_{t2}(t), \ldots, z_{tm}(t)$, respectively, to the m antennas, where $z_{ti}(t)=w'_{ti}s_t(t)$, $i=1, \ldots, m$, and $w_{ti}$ is a complex valued weight. The set of $w_{ti}$ can be summarized by $w_t$, a complex valued m-dimensional column vector with $i^{th}$ element $w_{ti}$, called the transmit weight vector for that user. That is, denoting the m signals at the m antennas by the column vector $z_t(t)$, with $i^{th}$ element $z_{ti}(t)$, $i=1, \ldots, m$, one has $$z_t(t)=w'_t s_t(t),$$

where $w'_t$ denotes the complex conjugate of vector $w_t$.

One alternatively can use spatio-temporal processing to transmit to the remote subscriber unit. In such a case, the transmit weight vector has elements which are functions of time (convolution kernels), and $z_{ti}(t)=w'_{ti}(t)*s_t(t)$, $i=1, \ldots, m$. Using vector notation, $z_t(t)=W'_t(t)*s_t(t)$. Again, in the remainder of the description, whenever complex valued transmit weight vector $w_t$ or its elements are mentioned, it will be understood that this may be generalized to incorporate spatio-temporal processing as described above.

The system of the preferred embodiment uses TDD, so that the transmit and receive frequencies are known to be the same. The well known principle of reciprocity is used to determine the transmit weight vector for a particular user from the receive weight vector for that user, such receive weight vector determined from the received signals from that user.

In practice, the actual weight vector calculated would be for signals received at the antenna elements, but used on and possibly calculated from signals received at the end of the receiver apparatus chain, thus would contain not only information about the uplink propagation paths to each antenna element of the base station antenna array but also the amplitude and phase errors introduced by each of the receiver apparatus chains associated with each antenna element. Consequently, a receive weight vector determined from these signals does not use an accurate representation of the characteristics of the propagation path between the base station and the subscriber station. Calibration data for the receive apparatus chain is needed for determining the propagation characteristics (gain and phase). A particular signal from one antenna element measured at the receiver would need to have relative phase advanced if that signal is delayed by the receiver apparatus chain relative to signals from other antenna elements. Similarly, in the downlink direction, a transmit weight determining what should be transmitted from the antenna elements would produce errors in the antenna elements if applied at the transmit signal processor because of the amplitude and phase errors introduced by each of the transmit apparatus chains associated with each antenna element. A particular weight vector element corresponding to a particular antenna element needs to have relative phase advanced if a signal sent at the signal processor is delayed by the transmit apparatus chain relative to other signals sent to the other antenna elements.

In one embodiment of the invention, $w_{ti}=H'_i w_{ri}$, where $H_i$ is a scalar calibration factor for the $i^{th}$ antenna receive and transmit apparatus chains, $i=1, \ldots, m$. In another embodiment, spatio-temporal processing is used for transmit processing as a result of calibrating for the receive and transmit apparatus chains, and in this case, in the frequency domain, $W_{ti}(k)=H'_i(k)w_{ri}$, where $H_i$ is a calibration factor for the $i^{th}$ antenna receive and transmit apparatus chains, $i=1, \ldots, m$. If the receiver processing also is spatio-temporal, then in the frequency domain, $W_{ti}(k)=H'_i(k)W_{ri}(k)$, $i=1, \ldots, m$.

In the preferred embodiment, when reception and transmission to a particular remote user is carried out, the calibration which is applied to an element of the transmit weight vector obtained from the receive weight vector is, in phase, a function of the difference in the phases between the transmit chain phase and the receive chain phase for the signals corresponding to that element.

The experiment performed at the base station to determine the calibration factors is now described. In one aspect of the invention, the experiment uses a base station of the general architecture shown in FIG. 1, and is constrained to using the base station itself. Such a base station includes an antenna array 103 of antenna elements, each antenna element having a corresponding transmit apparatus chain from the message signal input through to the antenna element, and a corresponding receiver apparatus chain from antenna element, through to, and including, a receive signal processor. In addition, a transmit signal processor, possibly the receive signal processor, is included in the base station for generating calibration test signals and extracting calibration data from received signals.

Preferably the hardware implementing the preferred embodiment of the present invention is as shown in FIG. 2.

Figure 3A:
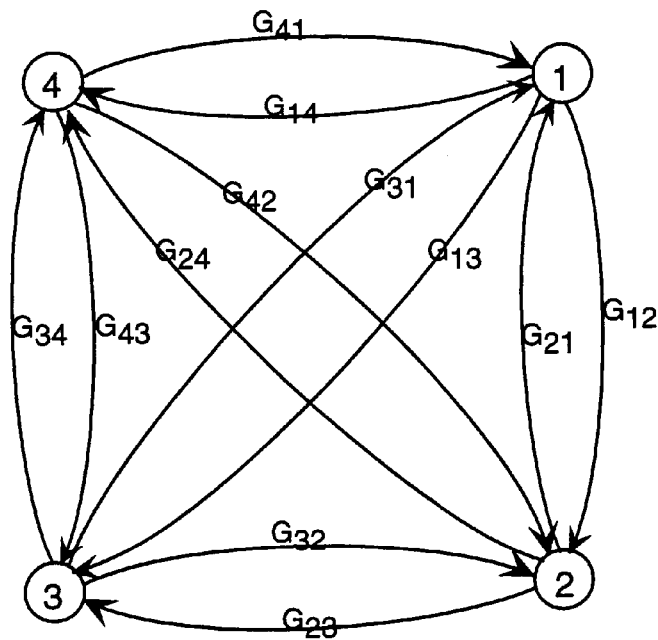
FIG. 3(a) shows the intra-array propagation paths of an antenna array, a four element array in FIG. 3(a) and a five element array in FIG. 3(b)
Figure 3B:
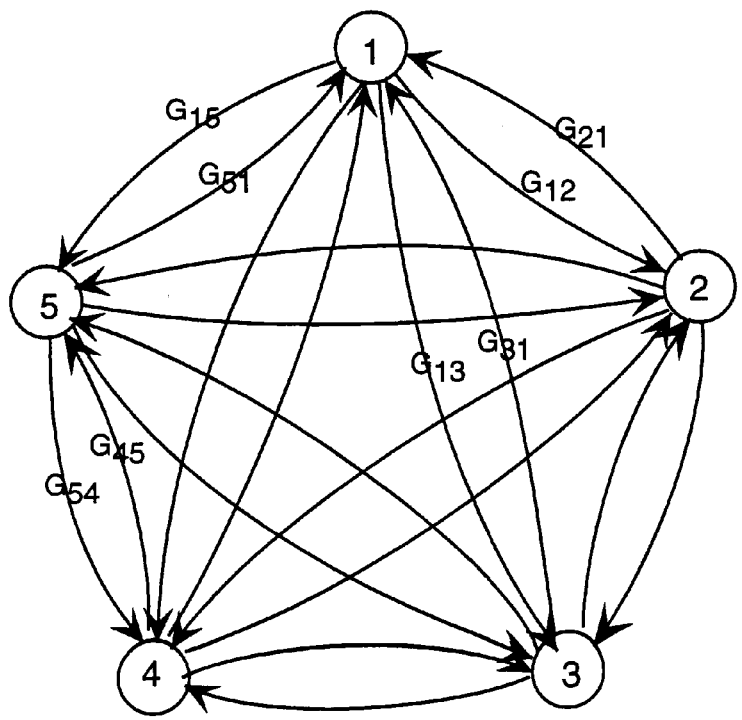

The basic method of the calibration experiment involves transmitting a known signal using the transmitter apparatus chain associated with one of m antenna elements while receiving the transmitted signal on each of the other (m−1) antenna elements and through each of the (m−1) associated receiver apparatus chains. FIG. 3(a) shows the pertinent propagation paths for an antenna array with four antenna elements while FIG. 3(b) shows the propagation paths for a five element antenna array. The numbered nodes represent antenna elements while the interconnecting directional arrows indicate duplex paths, and the associated set of labels, $\{G_{ij}\}$, indicate the gain and phase shift associated with each path. The number of duplex paths, $m(m-1)/2$, increases quadratically with the number of antenna elements in an array. Note that not all labels $\{G_{ij}\}$ are shown on FIG. 3(b).

Thus, in the four antenna case, four transmissions are made, each from one of the antennas in the array, and measurements are made for each transmission of the three receivers not transmitting.

Each signal in the set of received signals, in baseband, $\{s_{ij}(t)\}$, is a sampled function of time (t) and each member of the set may be represented as:

$$s_{ij}(t)=s_i(t)*\tau_i(t)*g_{ij}(t)*r_j(t), \quad i,j=1,\ldots,4, \qquad \text{Eqn. (1)}$$

where:

$s_{ij}(t)$ is a time series (i.e., a set of samples) representing the signal, in baseband, transmitted from antenna i and received by antenna j;

$s_i(t)$ is the time series calibration signal, in baseband, transmitted from antenna i;

$\tau_i(t)$ is a convolution kernel representative of the baseband transfer function of transmit chain i;

$g_{ij}(t)$ is a convolution kernel representative of the transfer function of the propagation path between antennas i and j;

$r_j(t)$ is a convolution kernel representative of the transfer function of the receive apparatus chain; and

* represents the convolution operator.

Eqn. (1) may be expressed by the equivalent frequency domain (Fourier transform) representation as:

$$S_{ij}(k)=S_i(k)\cdot T_i(k)\cdot G_{ij}(k)\cdot R_j(k)$$

where each of the terms are Fourier transforms of the corresponding terms of Eqn. (1) and are complex frequency domain functions (having an associated amplitude and phase) for each value of the independent discrete frequency argument k. Thus, the frequency domain and corresponding time domain functions may be expressed as follows:

$S_{ij}(k) \leftrightarrow s_{ij}(t)$ is the frequency domain and time domain received signal;

$S_i(k) \leftrightarrow s_i(t)$ is the frequency domain and time domain transmitted signal by the $i^{th}$ transmitter chain;

$T_i(k) \leftrightarrow \tau_i(t)$ is the frequency domain transfer function and time domain convolution kernel of the $i^{th}$ transmitter chain (including the $i^{th}$ transmitter antenna element);

$G_{ij}(k) \leftrightarrow g_{ij}(t)$ is the frequency domain transfer function and time domain convolution kernel of the propagation path from the $i^{th}$ to the $j^{th}$ antenna element; and $R_j(k) \leftrightarrow r_j(t)$ is the frequency domain transfer function and time domain convolution kernel of the receiver chain (including the $j^{th}$ receiver antenna element).

In the preferred PHS embodiment using the system of FIG. 2, m=4. Thus, a known signal is transmitted by one antenna element and simultaneously received on the remaining (m−1)=3 antenna elements. It is important to note that both the receiver and transmitter capabilities of the base station are being used simultaneously and due to the proximity of the transmitting antenna element and the receiving antenna elements the propagation losses are very small (about 30 dB). The same procedure is repeated for a total m sets of measurements using for each set a different antenna element to transmit to the remaining m−1 antennas and results in m sets of m−1 measured signals for a total of m(m−1) measurements (12 in the preferred embodiment). In the preferred embodiment, because of the small propagation path losses, the weights applied to each receiver are scaled down in order not to saturate the receivers.

Not known are the m transmitter chain calibrations (the $\{T_i\}$), the m receiver chain calibrations (the $\{R_j\}$), and the transfer functions of twice the number of paths (the m(m−1)/2 $G_{ij}$) between each antenna and the remaining m−1 antennas. Hence the total number of unknowns is m(m+1) which is 20 in the case of m=4, and the number of equations that can be formed by measurements is 12. The number of unknowns to be determined may be reduced as follows. Assuming reciprocity, as applies for a TDD system, the paths between each antenna and the remaining m−1 antennas are the same in either direction, so that there are m(m−1)/2 less unknowns, for a total of m(m+3)/2 unknowns, 14 in the case of m=4. Since in one aspect, one is primarily interested in relative receive and transmit calibration factors, one may assume that one of the transmit and one of the receive transfer functions are 1.0. In the preferred embodiment, one assumes $R_1(k)=T_1(k)=1.0$ for all k. Thus, for m=4, the following twelve equations need to be solved:

$$S_{12}=G_{12}R_2 \qquad \text{Eqns. (2)}$$
$$S_{13}=G_{13}R_3$$
$$S_{14}=G_{14}R_4$$
$$S_{21}=T_2G_{21}$$
$$S_{23}=T_2G_{23}R_3$$
$$S_{24}=T_2G_{24}R_4$$
$$S_{31}=T_3G_{31}$$
$$S_{32}=T_3G_{32}R_2$$
$$S_{34}=T_3G_{34}R_4$$
$$S_{41}=T_4G_{41}$$
$$S_{42}=T_4G_{42}R_2$$
$$S_{43}=T_4G_{43}R_3$$

These equations may be linearized by taking the logarithm of both sides, e.g. logarithms to the base e, defined as function $\log_e(x) = \ln x$. The resulting equations are $$\begin{bmatrix} 1 & 0 & 0 & 0 & 0 & 0 & 1 & 0 & 0 & 0 & 0 & 0 \\ 0 & 1 & 0 & 0 & 0 & 0 & 0 & 1 & 0 & 0 & 0 & 0 \\ 0 & 0 & 1 & 0 & 0 & 0 & 0 & 0 & 1 & 0 & 0 & 0 \\ 0 & 0 & 0 & 1 & 0 & 0 & 1 & 0 & 0 & 0 & 0 & 0 \\ 0 & 1 & 0 & 1 & 0 & 0 & 0 & 0 & 0 & 1 & 0 & 0 \\ 0 & 0 & 1 & 1 & 0 & 0 & 0 & 0 & 0 & 0 & 1 & 0 \\ 0 & 0 & 0 & 0 & 1 & 0 & 0 & 1 & 0 & 0 & 0 & 0 \\ 1 & 0 & 0 & 0 & 1 & 0 & 0 & 0 & 0 & 1 & 0 & 0 \\ 0 & 0 & 1 & 0 & 1 & 0 & 0 & 0 & 0 & 0 & 0 & 1 \\ 0 & 0 & 0 & 0 & 0 & 1 & 0 & 0 & 1 & 0 & 0 & 0 \\ 1 & 0 & 0 & 0 & 0 & 1 & 0 & 0 & 0 & 0 & 1 & 0 \\ 0 & 1 & 0 & 0 & 0 & 1 & 0 & 0 & 0 & 0 & 0 & 1 \end{bmatrix} \begin{bmatrix} \ln R_2 \\ \ln R_3 \\ \ln R_4 \\ \ln T_2 \\ \ln T_3 \\ \ln T_4 \\ \ln G_{12} \\ \ln G_{13} \\ \ln G_{14} \\ \ln G_{23} \\ \ln G_{24} \\ \ln G_{34} \end{bmatrix} = \begin{bmatrix} \ln S_{12} \\ \ln S_{13} \\ \ln S_{14} \\ \ln S_{21} \\ \ln S_{23} \\ \ln S_{24} \\ \ln S_{31} \\ \ln S_{32} \\ \ln S_{34} \\ \ln S_{41} \\ \ln S_{42} \\ \ln S_{43} \end{bmatrix}. \qquad \text{Eqn. (3)}$$

To obtain separate calibration for the receiver chain and transmit chain, these equations need to be solved. It was found that explicit solution may need further assumptions.

In the preferred embodiment, the receive weights, for example in the frequency domain are determined without calibration, and the frequency domain transmit weight vector is the frequency domain receive weight vector multiplied by a (frequency dependent) m by m diagonal calibration matrix determined by a calibration vector. In the preferred embodiment, each transmit weight vector element is the corresponding receive weight vector multiplied at each frequency by the ratio of receive apparatus chain response to transmit apparatus chain response for the particular element. To see that this in principle gives the correct calibration on transmit, consider that on reception with a single user, a signal (the spatial signature a of $i^{th}$ element $a_i$) arrives at antenna i later than at antenna j (positive phase). Suppose also that the receiver apparatus chain causes that signal arriving at antenna i to take longer arrive at the signal processor than the signal which arrives at antenna j (positive phase). Let $G_i$ describe the air path from the remote user to the $i^{th}$ antenna element and that suppose a unit signal is sent from the remote user. Then the $i^{th}$ element of a is the signal at the $i^{th}$ antenna element, $G_i$. The signal received at the signal processor is $G_iR_i$. This means that the receive weight vector would have $i^{th}$ element proportional to $G_iR_i$. If one follows the preferred strategy, one would transmit a signal proportional to $G'_iR'_i$ at the transmit electronics (in other words, with a weight vector with $i^{th}$ element proportional to $G_iR_i$), which would lead to a signal at the $i^{th}$ antenna element proportional to $G'_iR'_iT_i$, (equivalent to transmitting with a weight vector with $i^{th}$ element at the antenna proportional to $G_i R_i T'_i$). It is desired, according to the preferred strategy to transmit with a signal at the $i^{th}$ antenna element proportional to $G'_i$, that is, with a weight vector with $i^{th}$ element at the antenna proportional to $G_i$. To achieve this, a calibration factor of $R_i/T_i$ for the $i^{th}$ element transmitted signal is required, noting that $R'_i$ is proportional to $1/R_i$. This is the same as applying a transmit weight vector element calibration factor proportional to $R'_i/T_i$. Define calibration factor $H_i = R_i/T_i$.

Thus, in one aspect of the invention, in the calibration procedure for m=4, one receives twelve signals from four sets of measurements. Defining (frequency domain) signal ratios $Q_{ij}$ by $$Q_{ij} = S_{ij}/S_{ji}$$

where the division is between for each element, and where, as before, $S_{ij}$ is the signal transmitted from the $i^{th}$ antenna and received at the $j^{th}$ antenna element. Then, using reciprocity ($G_{ij} = G_{ji}$), $$Q_{ij} = T_j R_j / R_i T_j = H_j / H_i$$

where as above, calibration factors $H_i$ is the ratio of the receive chain transfer function $R_i$ to transmit chain transfer function $T_i$ for the $i^{th}$ channel. The twelve equations result in six ratios. Since one is interested in relative calibration, define $H_1 = 1.0$. Other calibrations are then determined relative to one particular channel, arbitrarily the first channel. Several ways of forming a sufficient number of equations to solve are possible. The following equations may be used.

$$H_1 = 1.0 \qquad \text{Eqns. (4)}$$
$$H_2 = Q_{12} H_1 = Q_{12} = S_{12}/S_{21}$$
$$H_3 = Q_{13} H_1 = Q_{31} = S_{13}/S_{31}$$
$$H_4 = Q_{14} H_1 = Q_{14} = S_{14}/S_{41}$$
$$H_3 = Q_{23} H_2$$
$$H_4 = Q_{24} H_2$$
$$H_4 = Q_{34} H_3$$

In one embodiment, the first four equations in Eqns. (4) give the calibration factors to use, so that the calibration factor for an element relative to a reference element (e.g., $H_2$ relative to $H_1$) is the ratio of the signal sent from the reference element and received at the element (e.g., $S_{12}$) to the signal sent from the element and received at the reference element (e.g., $S_{21}$).

In an alternate embodiment, these calibration factors are then checked for consistency with the equations $H_3 = Q_{23} H_2$, $H_4 = Q_{24} H_2$, and $H_4 = Q_{34} H_2$, multiplying each calibration factor obtained one way with the complex conjugate of the same factor determined another way gives a number whose phase is a measure of the phase error. In the alternate embodiment, a threshold is used to flag an unacceptable phase error, and the flag can then be used to cause repeating the calibration procedure.

In another embodiment, all equations are solved in a least squared sense using linearization of Eqns. (4), which may be linearized by taking the logarithm of each side, solving the overdetermined set of equations, and finally compute the three calibration constants by reconverting the results from log space. The linearized equations are:

$$\ln H_2 = \ln Q_{12}$$
$$\ln H_3 = \ln Q_{13}$$
$$\ln H_4 = \ln Q_{14}$$
$$\ln H_3 = \ln Q_{23} + \ln H_2$$
$$\ln H_4 = \ln Q_{24} + \ln H_2$$
$$\ln H_4 = \ln Q_{34} + \ln H_3$$

These can be expressed in the following matrix format:

$$\begin{bmatrix} 1 & 0 & 0 \\ 0 & 1 & 0 \\ 0 & 0 & 1 \\ -1 & 1 & 0 \\ -1 & 0 & 1 \\ 0 & -1 & 1 \end{bmatrix} \begin{bmatrix} \ln H_2 \\ \ln H_3 \\ \ln H_4 \end{bmatrix} = \begin{bmatrix} \ln Q_{12} \\ \ln Q_{13} \\ \ln Q_{14} \\ \ln Q_{23} \\ \ln Q_{24} \\ \ln Q_{34} \end{bmatrix},$$

which results in the following solutions:

$$\ln H_2 = 0.5 \ln Q_{12} + 0.25 \ln Q_{13} + 0.25 \ln Q_{14} - 0.25 \ln Q_{23} - 0.25 \ln Q_{24}, \qquad \text{Eqns. (5)}$$

$$\ln H_3 = 0.25 \ln Q_{12} + 0.5 \ln Q_{13} + 0.25 \ln Q_{14} + 0.25 \ln Q_{23} - 0.25 \ln Q_{34},$$

$$\ln H_4 = 0.25 \ln Q_{12} + 0.25 \ln Q_{13} + 0.5 \ln Q_{14} + 0.25 \ln Q_{24} + 0.25 \ln Q_{34},$$

which must now be converted to linear terms using $$H_2 = \exp(\ln H_2), \qquad \text{Eqns. (6)}$$
$$H_3 = \exp(\ln H_3), \text{ and}$$
$$H_4 = \exp(\ln H_4).$$

In the above discussion, transfer functions are used for the calibration of the communication system. The computation of transfer functions is well known in the art. Transfer functions are generally functions of the independent frequency argument which implies that multiple frequency (or broad band) signals and functions are involved. However, if the transfer function magnitude is relatively uniform and has an approximately linear phase characteristic over the signal band, all the transfer functions are constant in the band of interest (300 kHz in the case of the preferred embodiment). In such a case, the ratios $Q_{ij}$ may be replaced by ratios calculated in the time domain as follows:

$$Q_{ij} = \frac{\sum_t s'_{ji}(t) s_{ij}(t)}{\sum_t |s_{ji}(t)|^2}$$

where the summations are over all the samples of interest, or, in an alternate embodiment, a subset of the samples received. The resulting calibration factors $H_i$, i=1, . . . , m also are complex valued (i.e., phase and amplitude) scalars, and the resulting transmit weight vector elements also are complex valued scalars if the corresponding receive weight vector elements are scalar.

In the preferred embodiment, using the apparatus of FIG. 2, a standard SYNCH burst (See Our Demodulation Invention Document for details of a SYNCH burst) is sent through one of the four antennas in four consecutive receive timeslots. In alternate embodiments, transmit timeslots may be used and/or other known signals may be used for transmission. The complex valued (in phase and quadrature) receiver signal outputs from each of the three receiver apparatus chains connected to the non-transmitting antennas are measured. In the preferred apparatus of FIG. 2, timeslot processors 317 are used.

Figure 4:
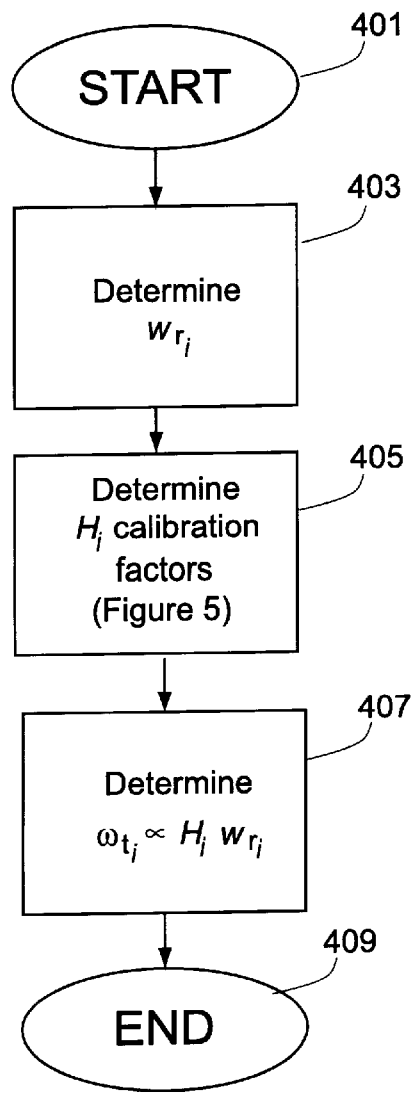
FIG. 4 shows the flow chart of one aspect of the invention: a method for determining calibrated transmit weights from receive weights and calibration factors.

One aspect of the invention is using calibrated downlink weights obtained from uplink weights and calibration factors. A flow chart for determining downlink weights using calibration is shown in FIG. 4. Step 403 is determining the uplink weights $w_{ri}$, i=1, . . . , m. In the preferred embodiment for the base station described by FIG. 2, determining uplink weights is as described in Our Demodulation Invention Document. Step 405 is determining calibration factors $H_i(k)=R_i(k)/T_i(k)$. The preferred embodiment for step 405, determining calibration factors is described by the flow chart of FIG. 5 and determines non frequency-dependent calibration factors. In step 407, the calibration factors from step 405 and the receive weights from step 403 are used to determine transmit weights by multiplying the receive weight vector element by the complex conjugate of the corresponding calibration factor. The relative magnitudes of the transmit weight vector elements are determined in this step 407, while the overall magnitude is determined as part of power control.

Figure 5:
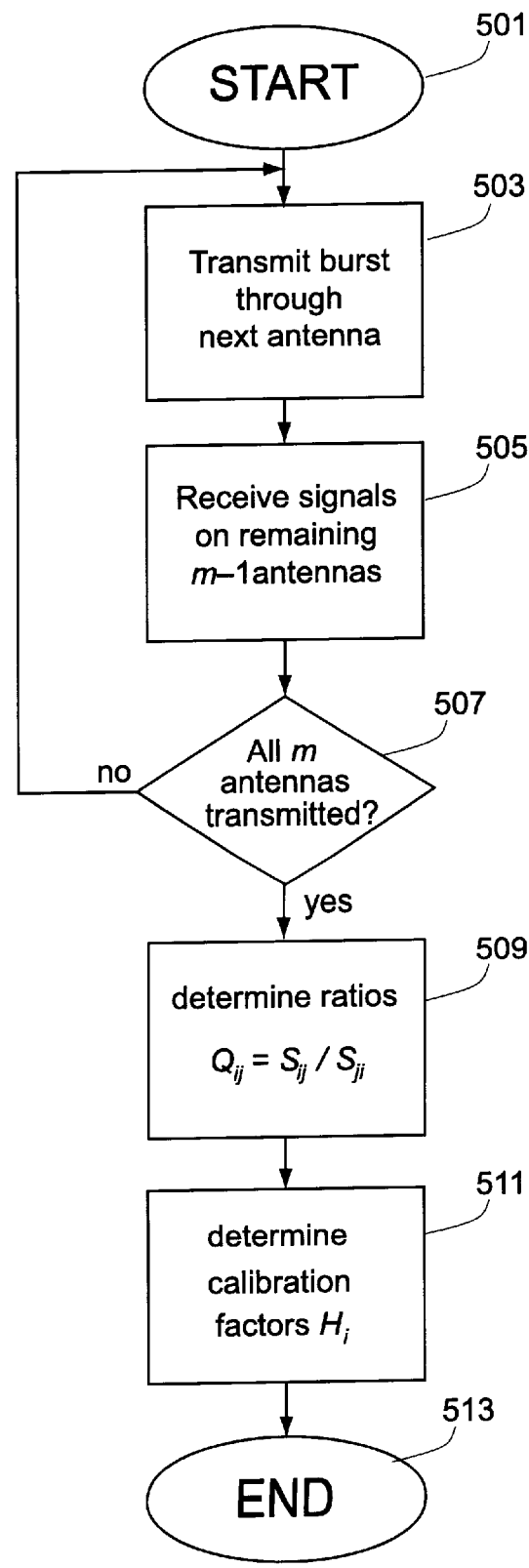
FIG. 5 shows the flow chart of an embodiment of the calibration method of the invention.

An embodiment of step 405, determining the calibration factors, is described with the help of the flow chart of FIG. 5. Steps 503 and 505 are carried out for each of the m antenna elements. Many ways of ensuring this are possible. In the flow chart one such method is used: step 507 determines if steps 503 and 505 have been carried out for all antenna elements. If not, steps 503 and 505 are repeated for another antenna element until all have been traversed. In step 503, a burst, preferably a SYNCH burst, is transmitted through an antenna element not yet traversed. In step 505, carried out during transmission step 503, signals received in the remaining (m−1) antennas as a result of transmission step 503 are obtained. Preferably, the in phase and quadrature values are determined using the receiver apparatus chain associated with the particular antenna element. When the embodiment of FIG. 2 of the overall system of FIG. 1 is used, during step 503, the duplexer switch 107 is put in the transmit mode for the transmitting antenna and in the receive mode for the other m−1 antennas. The transmit apparatus chain 121 is used for transmitting, and the receiver apparatus chain 113 is used for receiving. When using the apparatus of FIG. 2, host DSP 231 and RF/Timing controller 133 are used to control steps 503 and 505. Timeslot processors 217 for the particular timeslot are used to receive the signals during step 505.

In step 509, the ratios are determined of the signal received by some antenna element (when receiving) from another antenna element (when transmitting) to the signal received by that other antenna element (when receiving) when a signal is transmitted by said some antenna element (when transmitting). In one embodiment, this ratio is determined in the frequency domain. In another embodiment, including that using the apparatus of FIG. 2, in which a SYNCH pulse is transmitted, a set of time samples is used, the time samples corresponding to a subset of the samples of the SYNCH pulse, and the ratio, a complex valued scalar denoted $Q_{ij}$, is determined using $$Q_{ij} = \frac{\sum_t s_{ji}^*(t) s_{ij}(t)}{\sum_t |s_{ji}(t)|^2}$$

where the summation is over said subset of samples.

In step 511, using the ratios determined in step 509, calibration factors are determined relative to one antenna element, denoted the reference. As described hereinabove, in one embodiment, the first four equations in Eqns. (4) are used give the calibration factors, so that the calibration factors relative to a reference element are the ratio of the signal sent from the reference element and received at the element to the signal sent from the element and received at the reference element. Also as described hereinabove, in another embodiment, the first four equations in Eqns. (4) are used give the calibration factors directly, and step 519 further involves a consistency check using the last three equations of Eqns. (4). In yet another embodiment, Eqns. (5) and (6) are used to obtain the calibration factors.

In the embodiment using the apparatus of FIG. 2, the calibration factors are determined by host DSP 231 and are based on scalar ratios. In other embodiments, frequency domain calibrations factors are obtained.

In non-TDD, for example, FDD systems, once a procedure for determining uncalibrated transmit weights from received signals or from receive weights is used, different embodiments of the method of the invention may be used to achieve calibration. The method would need to be modified only to account for the difference in transmission frequencies and receiving frequencies.

While the above is a complete description of specific embodiments of the invention, those embodiments are only for illustrative purposes, and various modifications, alternative constructions, and equivalents may be used. Therefore, the above description should not be taken as limiting the scope of the invention. It is intended that the scope of the invention be defined by the claims appended hereto, and their legal equivalents.

What is claimed is:

1. A method for calibrating a communications station without requiring any equipment in addition or external to the communication station, the communications station comprising an antenna array with a plurality of antenna elements, a receiver apparatus chain for each antenna element, and a transmit apparatus chain for each antenna element, each receiver apparatus chain including its antenna element, and each transmit apparatus chain including its antenna element, relative phase and amplitude behavior of each receiver apparatus chain essentially describable by a receiver apparatus chain transfer function for said each receiver apparatus chain, relative phase and amplitude behavior of each transmit apparatus chain essentially describable by a transmit apparatus chain transfer function for said each transmit apparatus chain, the method comprising:

(a) transmitting a first prescribed signal from a first antenna element through a first transmit apparatus chain while receiving the transmitted signal in at least one antenna element through its receiver apparatus chain, the receiving antenna element not the first antenna element, the first antenna element being part of the first transmit apparatus chain;

(b) repeating step (a) transmitting prescribed signals from other antenna elements through other transmit apparatus chains until prescribed signals have been transmitted from all antenna elements for which calibration factors are required, and any prescribed signal transmission from any particular antenna element has been received by a sufficient number of the other antenna elements to determine the required set of calibration factors; and (c) determining calibration factors for each antenna element used in said step (a) and the repetitions of said step (b), each antenna element having one or more calibration factors for a particular antenna element based on the transmit apparatus chain and receiver apparatus chain transfer functions of the transmit and receiver apparatus chains, respectively, that include the particular antenna element, said determining using the first prescribed signal and the prescribed signals and each of the signals received in step (a) and the repetitions (b), the method not requiring any equipment in addition or external to the communication station.

2. The method of claim 1 wherein step (a) and the repetitions (b) of step (a) further include storing the signals received, and wherein each of the received signals used in said determining step (c) are the signals stored in step (a) and the repetitions (b) of step (a).

3. The method of claim 2 wherein the same prescribed signal is used in step (a) and the repetitions (b) of step (a).

4. The method of claim 2 wherein said step (c) includes determining the transmit and receiver apparatus chain transfer functions.

5. The method of claim 3 wherein the communications station is part of a communications system which includes at least one subscriber unit, downlink communication and uplink communication between the communications station and the subscriber unit occurring in the same frequency channel, and wherein a single calibration factor is determined in said step (c) for any antenna element, the single calibration factor being in phase a function of the difference between the transmit apparatus chain transfer function phase and the receiver apparatus chain transfer function phase of the transmit and receiver apparatus chains, respectively, that share said any antenna element.

6. The method of claim 3 wherein the communications station is part of a communications system which includes at least one subscriber unit, downlink communication and uplink communication between the communications station and the subscriber unit occurring in the same frequency channel, and wherein a single calibration factor is determined in said step (c) for any antenna element, the single calibration factor being a function of the ratio of the transmit apparatus chain transfer function to the receiver apparatus chain transfer function, the receiver and transmit apparatus chain in the ratio sharing said any antenna element.

7. The method of claim 3 wherein determining step (c) determines calibration factors that are dependent on frequency.

8. The method of claim 4 wherein one receiver apparatus chain and one transmit apparatus chain sharing a common antenna element are respectively designated as a reference receive apparatus chain and a reference transmit apparatus chain, and all receiver and transmit apparatus chain transfer functions are respectively determined relative to the reference receive apparatus and reference transmit apparatus transfer functions.

9. The method of claim 5 wherein one antenna element is designated as a reference antenna element, and all calibration factors not of the reference antenna element are respectively determined relative to the calibration factor of the reference antenna element.

10. The method of claim 6 wherein one antenna element is designated as a reference antenna element, and all calibration factors not of the reference antenna element are respectively determined relative to the calibration factor of the reference antenna element.

11. The method of claim 9 wherein step (c) includes determining calibration factors that are essentially independent of frequency, the calibration factor for a particular antenna element that is not the reference antenna element being in phase a function of phase difference between the signal received at the receiver apparatus chain that includes the particular antenna element when the prescribed signal is transmitted from the transmit apparatus chain that includes the reference antenna element, and the signal received at the receiver apparatus chain that includes the reference antenna element when the prescribed signal is transmitted from the transmit apparatus chain that includes the particular antenna element.

12. The method of claim 10 wherein step (c) includes determining calibration factors that are essentially independent of frequency, the calibration factor for a particular antenna element that is not the reference antenna element being a function of the ratio of the signal received at the receiver apparatus chain that includes the particular antenna element when the prescribed signal is transmitted from the transmit apparatus chain that includes the reference antenna, to the signal received at the receiver apparatus chain that includes the reference antenna element when the prescribed signal is transmitted from the transmit apparatus chain that includes the particular antenna element.

13. A method for sending a downlink signal from a communications station to a subscriber unit, the communications station comprising an antenna array with a plurality of antenna elements, a receiver apparatus chain for each antenna element, and a transmit apparatus chain for each antenna element, each receiver apparatus chain including its antenna element, and each transmit apparatus chain including its antenna element, relative phase and amplitude behavior of each receiver apparatus chain essentially describable by a receiver apparatus chain transfer function for said each receiver apparatus chain, relative phase and amplitude behavior of each transmit apparatus chain essentially describable by a transmit apparatus chain transfer function for said each transmit apparatus chain, the method comprising:

(a) performing an experiment at the communications station to determine a set of calibration factors, the set including a single calibration factor for each particular antenna element for which calibration is required, the single calibration factor dependent on the receiver apparatus chain transfer function and the transmit apparatus chain transfer function of the particular antenna element;

(b) weighting the downlink signal according to a set of transmit weights to form a set of weighted transmit signals for each antenna element, the transmit weight for the particular antenna element determined from signals received at the antenna array during uplink communications with the subscriber unit and from the single calibration factor of the particular antenna element determined in step (b); and (c) transmitting the weighted transmit signals through the transmit apparatus chains.

14. The method of claim 13, wherein the communications station is able to communicate in the uplink with the subscriber unit by processing received signals, each received signal determined from a corresponding signal at one of the antenna elements, the processing including weighting the received signals according to a set of receive weights determined from the received signals, each receive weight corresponding to one of the antenna elements, and wherein the transmit weight for the particular antenna element is determined from the receive weight corresponding to the particular antenna element and from the calibration factor of the particular antenna element.

15. The method of claim 14 wherein downlink communication and uplink communication between the communications station and the subscriber unit occur in the same frequency channel and wherein the calibration factor used in step (b) is in phase a function of the difference between the transmit apparatus chain transfer function phase and the receiver apparatus chain transfer function phase for the corresponding antenna element, and wherein each transmit weight is proportional to the corresponding receive weight and to the corresponding calibration factor.

16. The method of claims 14 wherein downlink communication and uplink communication between the communications station and the subscriber unit occur in the same frequency channel and wherein the calibration factor used in step (b) is a function of the ratio of the receiver apparatus chain transfer function to the transmit apparatus chain transfer function for the corresponding antenna element, and wherein each transmit weight is proportional to the corresponding receive weight and to the corresponding calibration factor.

17. The method of claim 15 wherein determining step (a) determines calibration factors that are dependent on frequency.

18. The method of claim 15 wherein said step (a) includes:

(i) transmitting a prescribed signal through a first transmit apparatus chain while receiving the transmitted signal through at least one receiver apparatus chain that does not include the same antenna element as the first transmit apparatus chain;

(ii) repeating step (i) using other transmit apparatus chains and receive apparatus chains until all transmit apparatus chains have been transmitted through and a transmission from any particular antenna element has been received through a sufficient number of the receive apparatus chains of the other antenna elements to determine the required calibration factors, and (iii) determining the calibration factors from each of the signals received in step (i) and from the prescribed signals used in the transmissions of step (i).

19. The method of claim 18 wherein said step (a) further includes:

(iv) storing the signals received in step (i), wherein said step (iii) of determining determines the calibration factors from signals stored in step (iv) and the repetitions in repeating step (a)(ii).

20. The method of claim 18 wherein the same prescribed signal is used in the repetitions in repeating step (a)(ii).

21. The method of claim 19 wherein the same prescribed signal is used in the repetitions in repeating step (a)(ii).

22. The method of claim 20 wherein one antenna element is designated as a reference antenna element, and all calibration factors not of the reference antenna element are respectively determined relative to the calibration factor of the reference antenna element.

23. The method of claim 13, wherein the experiment of step (a) requires no equipment in addition or external to the communications station.

24. A self-calibrating communications station not requiring additional or external equipment for calibration, the communication station comprising (a) an antenna array with a plurality of antenna elements;

(b) a receiver apparatus chain for each antenna element, each receiver apparatus chain including its antenna element; relative phase and amplitude behavior of each receiver apparatus chain essentially describable by a receiver apparatus chain transfer function for said each receiver apparatus chain; and (c) a transmit apparatus chain for each antenna element, each transmit apparatus chain including its antenna element, relative phase and amplitude behavior of each transmit apparatus chain essentially describable by a transmit apparatus chain transfer function for said each transmit apparatus chain;

(d) transmitting means configured to transmit a prescribed signal from each antenna element using the antenna element's transmit apparatus chain while receiving the transmitted signal in at least one receiver apparatus chain not of the transmitting antenna element;

(e) a memory coupled to the receiver apparatus chains for storing the signals received during the transmissions of the prescribed signals; and (f) a signal processor coupled to the memory and configured to determine calibration factors for each antenna element, the calibration factors for a particular antenna element based on the transmit apparatus chain and receiver apparatus chain transfer functions of the transmit and receiver apparatus chains, respectively, that include the particular antenna element, said determining using the prescribed signal and each of the received signals stored in the memory and not requiring any equipment external or in addition to the communication station.

25. The communications station of claim 24 wherein said step (c) includes determining the transmit and receiver apparatus chain transfer functions.

26. The communications station of claim 24 wherein the communications station is part of a communications system which includes at least one subscriber unit, downlink communication and uplink communication between the communications station and the subscriber unit occurring in the same frequency channel, and wherein the signal processor determines a single calibration factor for any antenna element, the single calibration factor being in phase a function of the difference between the transmit apparatus chain transfer function phase and the receiver apparatus chain transfer function phase of the transmit and receiver apparatus chains, respectively, that share said any antenna element.

27. The communications station of claim 24 wherein the communications station is part of a communications system which includes at least one subscriber unit, downlink communication and uplink communication between the communications station and the subscriber unit occurring in the same frequency channel, and wherein the signal processor determines a single calibration factor for any antenna element, the single calibration factor being a function of the ratio of the transmit apparatus chain transfer function to the receiver apparatus chain transfer function, the receiver and transmit apparatus chain in the ratio sharing said any antenna element.

28. The communications station of claim 24 wherein the signal processor determines calibration factors that are dependent on frequency.

29. The communications station of claim 28 wherein one receiver apparatus chain and one transmit apparatus chain sharing a common antenna element are respectively designated as a reference receive apparatus chain and a reference transmit apparatus chain, and all receiver and transmit apparatus chain transfer functions are respectively determined relative to the reference receive apparatus and reference transmit apparatus transfer functions.

30. The communications station of claim 26 wherein one antenna element is designated as a reference antenna element, and all calibration factors not of the reference antenna element are respectively determined relative to the calibration factor of the reference antenna element.

31. The communications station of claim 27 wherein one antenna element is designated as a reference antenna element, and all calibration factors not of the reference antenna element are respectively determined relative to the calibration factor of the reference antenna element.

32. The communications station of claim 30 wherein the signal processor determines calibration factors that are essentially independent of frequency, the calibration factor for a particular antenna element that is not the reference antenna element being in phase a function of phase difference between the signal received through the receiver apparatus chain that includes the particular antenna element when the prescribed signal is transmitted through the transmit apparatus chain that includes the reference antenna, and the signal received through the receiver apparatus chain that includes the reference antenna element when the prescribed signal is transmitted through the transmit apparatus chain that includes the particular antenna element.

33. The communications station of claim 30 wherein the signal processor determines calibration factors that are essentially independent of frequency, the calibration factor for a particular antenna element that is not the reference antenna element being a function of the ratio of the signal received through the receiver apparatus chain that includes the particular antenna element when the prescribed signal is transmitted through the transmit apparatus chain that includes the reference antenna, to the signal received through the receiver apparatus chain that includes the reference antenna element when the prescribed signal is transmitted through the transmit apparatus chain that includes the particular antenna element.

* * * * *